US009233304B2

(12) United States Patent
Kurabayashi et al.

(10) Patent No.: US 9,233,304 B2
(45) Date of Patent: Jan. 12, 2016

(54) LOAD BALANCING FOR GAME

(75) Inventors: Shuichi Kurabayashi, Fujisawa (JP);
Naofumi Yoshida, Yokohama (JP);
Kosuke Takano, Fujisawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 404 days.

(21) Appl. No.: 13/426,868

(22) Filed: Mar. 22, 2012

(65) Prior Publication Data
US 2013/0253675 A1 Sep. 26, 2013

(51) Int. Cl.
A63F 13/00 (2014.01)
A63F 13/30 (2014.01)
A63F 13/33 (2014.01)
A63F 13/35 (2014.01)

(52) U.S. Cl.
CPC ............ *A63F 13/12* (2013.01); *A63F 13/33* (2014.09); *A63F 13/35* (2014.09); *A63F 2300/534* (2013.01); *A63F 2300/535* (2013.01)

(58) Field of Classification Search
CPC ...................................... A63F 13/12
USPC ........................................... 700/91
See application file for complete search history.

(56) References Cited

U.S. PATENT DOCUMENTS 7,293,235 B1 * 11/2007 Powers et al. ............ 715/706
7,695,370 B2   4/2010 Liu
7,814,154 B1 * 10/2010 Kandekar et al. ......... 709/205

FOREIGN PATENT DOCUMENTS

JP     2005010970 A    1/2005
WO    2011/160728 A1   12/2011

OTHER PUBLICATIONS

"Peer-to-Peer Support for Massively Multiplayer Games" by B. Knutsson, et al., 2004, pp. 96-107.
"Motion Prediction for Online Gaming" by R. Lau, et al., A. Egges, A. Kamphuis, and M. Overmars (Eds.): MIG 2008, LNCS 5277, pp. 104-114, 2008.
"Run-Time Load Balancing System on SAN-connected PC Cluster for Dynamic Injection of CPU and Disk Resource—A Case Study of Data Mining Application-", by K. Goda, et al., R.Cicchetti et al. (Eds.): DEXA 2002, LNCS 2453, pp. 182-192, 2002.
Nagaishi et al.: "A Prefetching Method Considering Mobility of Avatars in a Broadcast-based Cyberspace," IPSJ SIG Technical Report, Japan, Information Processing Society of Japan, Jul. 15, 2005, vol. 2005, No. 68, pp. 699-704.

* cited by examiner

*Primary Examiner* — Milap Shah
*Assistant Examiner* — Thomas H Henry
(74) *Attorney, Agent, or Firm* — Brundidge & Stanger, P.C.

(57) ABSTRACT

Technologies are generally described for load balancing for a game in a cloud computing environment hosting a game service. In some examples, a method may include analyzing a status of a player character located in a virtual space, the virtual space being configured to have a plurality of areas and the player character being located in a first area among the plurality of areas, calculating a probability of movement of the player character from the first area to a second area among the plurality of areas based at least in part on the analyzed status, and calculating an amount of cached data to copy from a second cache server corresponding to the second area to a first cache server corresponding to the first area based at least in part on the calculated probability.

22 Claims, 7 Drawing Sheets

LOAD BALANCING FOR GAME

BACKGROUND

The number of users enjoying online games such as a massive multiplayer online role playing game (MMORPG) is increasing. For example, the number of users of World of Warcraft, managed by Blizzard® Entertainment in the U.S., exceeds 12 million around the world. As the numbers of users enjoying the online games increases as stated above, scale-out using cloud computing systems becomes important.

However, the existing infrastructures for implementing a cloud computing environment are typically adapted to business applications, such as an e-mail application and a word processor, that run on personal computers, so that it is difficult to efficiently implement an online game. Specifically, since an online game such as an MMORPG requires real-time transfer of information to clients in a virtual world, communication between the database server and a game server tends to become a bottleneck.

SUMMARY

In an example, a method may include analyzing a status of a player character located in a virtual space, the virtual space being configured to have a plurality of areas and the player character being located in a first area among the plurality of areas; calculating a probability of movement of the player character from the first area to a second area among the plurality of areas based at least in part on the analyzed status; and calculating a quantity, or amount of cached data to copy from a second cache server corresponding to the second area to a first cache server corresponding to the first area based at least in part on the calculated probability.

In another example, a method may include dynamically configuring data caches for database servers based at least in part on status and predicted positions of game characters; and caching game data requested by game players associated with the game characters based at least in part on the dynamic configuration.

In yet another example, a load balancer may include a player status analyzer configured to analyze a status of a player character located in a virtual space, the virtual space being configured to have a plurality of areas and the player character being located in a first area among the plurality of areas; a cache manager configured to associate the plurality of areas of the virtual space with a plurality of cache servers, wherein each cache server caches from a database server information on an area allocated thereto; a movement probability calculator configured to calculate a probability of movement of the player character from the first area to a second area among the plurality of areas; and a copy factor calculator configured to calculate a quantity, or amount of cached data to copy from a second cache server corresponding to the second area to a first cache server corresponding to the first area based at least in part on the probability calculated by the movement probability calculator.

In yet another example, computer-readable storage medium may store a program for implementing load balancing between a database server storing game data and a game server, and the program may include a cache managing module configured to manage association between areas in a virtual space and cache servers, each of which caches from the database server some of the game data associated with a corresponding area; and a copy factor calculating module configured to calculate a quantity, or amount of cached data to copy from a second cache server corresponding to a second area to a first cache server corresponding to a first area based at least in part on probability of movement of a game character from the first area to the second area and distance between the first area and the second area.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
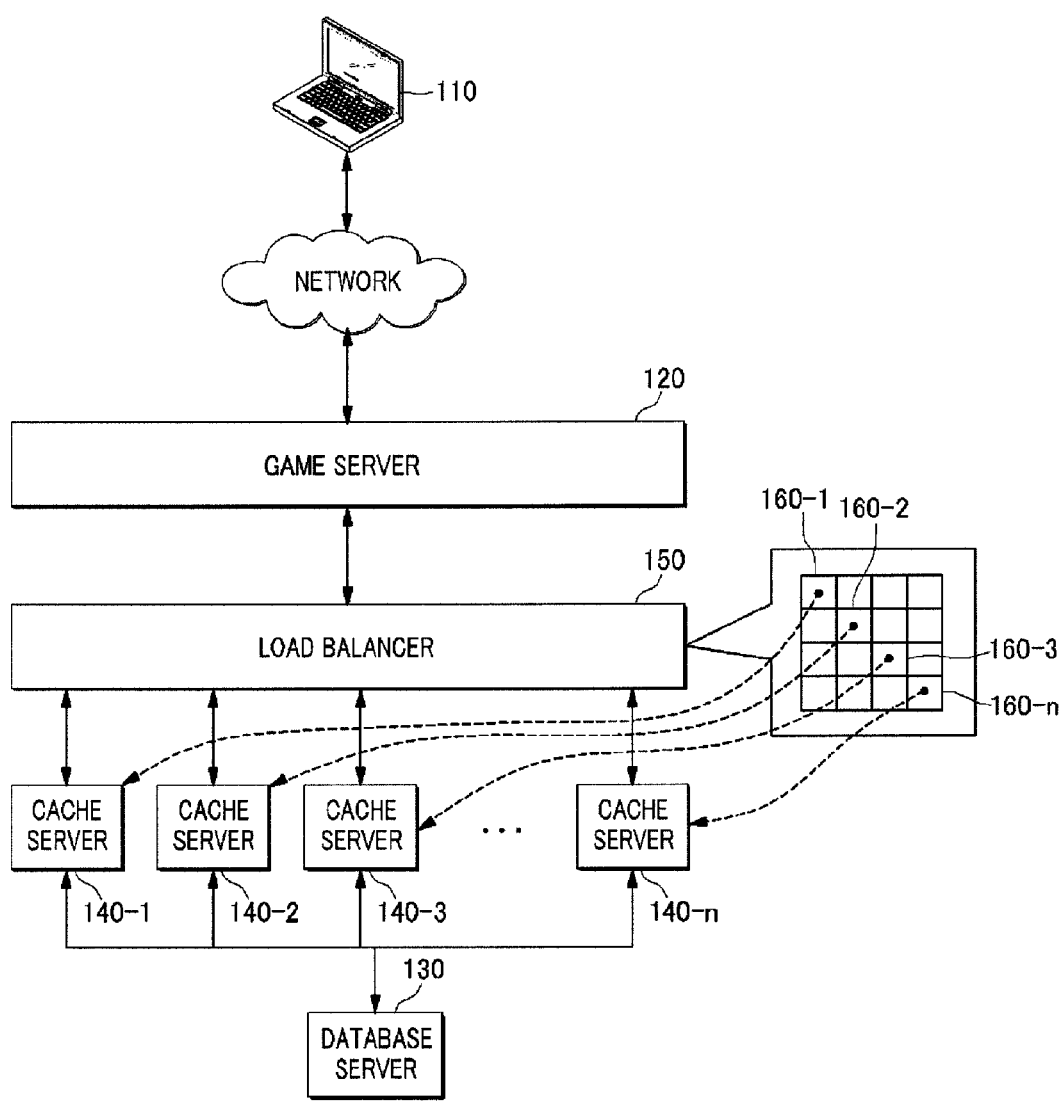
FIG. 1 schematically shows an illustrative example of an environment where a load balancer provides load balancing between a database server and a game server, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to load balancing in a cloud computing environment hosting a mobile service involving an online game such as an MMORPG.

Technologies are generally described herein for a load balancer configured to provide load balancing for a game between a database server and a game server. In some examples, the game in a cloud computing environment may be implemented using three server layers including a gateway server, a game server and a database server. In some examples, the load balancer may provide the load balancing between the database server and the game server to resolve a communication bottleneck therebetween due to increases in traffic. In some examples, in case of an online game, the load balancer may provide the load balancing between the database server and the game server to resolve the communication bottleneck caused by retrieval of a large volume of game data regarding virtual space of the game.

In some examples, the load balancer may dynamically configure data caches for the database server based at least in part on at least one of a position and status of a player character in the virtual space of the game, and cache game data requested by a user (or a player) based at least in part on the dynamic configuration, thereby speeding up data accesses from the game server to the database server.

In some examples, multiple cache servers, such as in-memory cache servers, that cache data retrieved from the database server may be used to reduce the number of accesses from the game server to the database server.

In some examples, to improve response speed and service providing capacity (i.e., the number of players that can play the game simultaneously) of the online game service, the load balancer may manage copies of data among the multiple cache servers.

In some examples, the load balancer may divide the virtual space into multiple areas, and manage the multiple cache servers such that each of the cache servers caches from the database server game data regarding one of the areas. The load balancer may manage association between the cache servers and the areas.

In some examples, the load balancer may receive a request for game data from the user, and calculate a probability of movement of the player character from a first area to a second area, based at least in part on a status of the player character analyzed with reference to the received request.

In some examples, the load balancer may calculate the probability statically in advance by using map information in the virtual space.

In some examples, the load balancer may then calculate a copy factor from a second cache server corresponding to the second area to a first cache server corresponding to the first area, i.e., a quantity or amount of cached data to copy from the second cache server to the first cache server, based at least in part on the calculated probability.

In some examples, by managing the copy factor for all areas and play characters, the cache servers may be configured to dynamically and/or automatically store information regarding areas to which player characters are likely to move, thereby reducing the number of accesses from the game server to the database server.

In some examples, the load balancer may be implemented as a network appliance that is independent of the game server and the database server. Thus, the load balancer may be introduced in a cloud computing environment without considerably modifying existing infrastructure and applications, to improve response speed and service providing capacity of the online game service.

FIG. 1 schematically shows an illustrative example of an environment in which a load balancer provides load balancing between a database server and a game server in accordance with at least some embodiments described herein. As depicted in FIG. 1, a user client 110 may send to a game server 120 a request for game data, which may be stored in a database server 130. By way of example, but not limitation, the request maybe associated with at least one of an action and movement of a player character of a game for an online game service provided by game server 120.

In some embodiments, database server 130 may store the game data regarding a virtual space of the game, in which one or more player characters may exist. In some embodiments, cache servers 140-1, 140-2, . . . , 140-$n$ may cache at least some of the game data stored in database server 130. In some embodiments, cache servers 140-1, 140-2, . . . , 140-$n$ may respectively cache from database server 130 at least some of the game data associated with one of multiple areas in the virtual space. By way of example, but not limitation, cache servers 140-1, 140-2, . . . , 140-$n$ may be in-memory cache servers. By way of example, but not limitation, respective sizes of the areas may vary depending on total number of cache servers 140-1, 140-2, . . . , 140-$n$ provided in the cloud computing environment and/or memory capacity of cache servers 140-1, 140-2, . . . , 140-$n$. For example, in cases in which a sufficient number of cache servers 140-1, 140-2, . . . , 140-$n$ are provided in the cloud computing environment and the memory capacity thereof is also sufficient, the area size may be set to be relatively small, while in cases in which the number of cache servers 140-1, 140-2, . . . , 140-$n$ is not sufficient and/or the memory capacity thereof is small, the area size may be set to be relatively large.

In some embodiments, a load balancer 150 may manage an association between cache servers 140-1, 140-2, . . . , 140-$n$ and the areas of the virtual space. By way of example, but not limitation, load balancer 150 may allocate cache servers 140-1, 140-2, . . . , 140-$n$ respectively to areas 160-1, 160-2, . . . , 160-$n$, and make cache servers 140-1, 140-2, . . . , 140-$n$ respectively cache or retrieve from database server 130 the game data associated with areas 160-1, 160-2, . . . , 160-$n$.

In some embodiments, load balancer 150 may also receive from game server 120 the request from user client 110. Then, load balancer 150 may analyze the received request and may acquire therefrom status information of a player character associated with user client 110. By way of example, but not limitation, the status information may include at least one of position information, level information, equipment information, party organization information, quest information and transfer means information of the player character.

In some embodiments, load balancer 150 may also calculate a probability of movement of the player character in the virtual space among areas based at least in part on the status information acquired from the request. By way of example, but not limitation, load balancer 150 may calculate probability of movement of the player character in the virtual space from the current location thereof to other areas in the virtual space, by taking into consideration a distance between the current location and the other areas.

In some embodiments, load balancer 150 may also calculate a copy factor among cache servers 140-1, 140-2, . . . , 140-$n$, i.e., an amount of cached data to copy among cache servers 140-1, 140-2, . . . , 140-$n$, based at least in part on the calculated probability. By way of example, but not limitation, load balancer 150 may calculate the copy factor from cache server 140-2 corresponding to area 160-2 to cache server 140-1 corresponding to area 160-1, i.e., the amount of cached data to copy from cache server 140-2 corresponding to area 160-2 to cache server 140-1 corresponding to area 160-1, based at least in part on the calculated probability of movement of the player character associated with user client 110 from area 160-1 to area 160-2. In some embodiments, the copy factor from cache server 140-2 to cache server 140-1 may increase as the calculated probability of movement from area 160-1 to area 160-2 increases. In some embodiments, the copy factor from cache server 140-2 to cache server 140-1 may decrease as a distance between area 160-1 and area 160-2 increases.

An example of the copy factor for copying information from a cache server corresponding to point $x_2y_2$ in virtual space to another cache server corresponding to point $x_1y_1$ in virtual space, i.e., copy_factor($x_1y_1$, $x_2y_2$), may be calculated in accordance with example Formula 1 as follows:

$$\text{copy\_factor}(x_1y_1, x_2y_2) := \text{item\_count}(x_2y_2) \frac{\text{probability}(x_1y_1, x_2y_2)}{\text{distance}(x_1y_1, x_2y_2)^2} \quad [\text{Formula 1}]$$

For Formula 1, item_count($x_2y_2$) denotes amount of cached data in the cache server corresponding to point $x_2y_2$; probability($x_1y_1$, $x_2y_2$) denotes the probability of movement of the player character associated with user client 110 from point $x_1y_1$ to point $x_2y_2$; and distance($x_1y_1$, $x_2y_2$) denotes a distance from point $x_1y_1$ to point $x_2y_2$ in the virtual space.

In some embodiments, load balancer 150 may dynamically manage or configure cache servers 140-1, 140-2, . . . , 140-$n$ by copying the calculated amount of cached data among cache servers 140-1, 140-2, . . . , 140-$n$ based at least in part on the copy factor calculated in accordance with Formula 1 above, thereby providing load balancing between database server 130 and game server 120.

Figure 2:
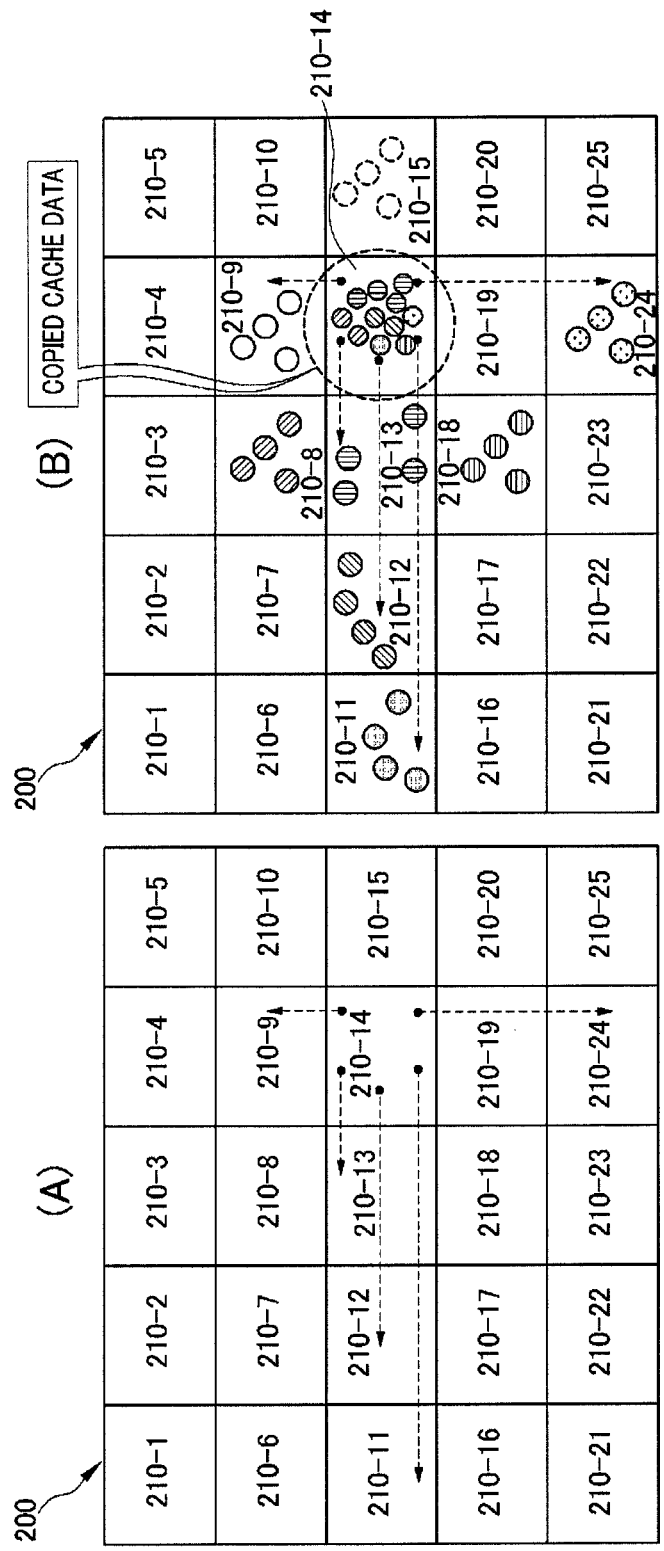
FIGS. 2(A)-(B) respectively show an illustrative example of a mesh structure for associating between cache servers and virtual space areas, and an illustrative example of copying cached data among the cache servers, arranged in accordance with at least some embodiments described herein.

FIGS. 2(A)-(B) respectively show an illustrative example of a mesh structure for associating between cache servers and virtual space areas, and an illustrative example of copying cached data among the cache servers in accordance with at least some embodiments described herein. As depicted, virtual space 200 may be divided into multiple areas 210-1, 210-2, . . . , 210-25. Although FIGS. 2(A)-(B) illustrate that space 200 is divided into twenty-five same-sized areas 210-1, 210-2, . . . , 210-25, it should be appreciated by one skilled in the relevant art that space 200 may also be divided into any number of and/or any sizes of areas.

In some embodiments, game data regarding areas 210-1, 210-2, . . . , 210-25 may be stored in a database server (e.g., database server 130). Multiple cache servers (e.g., cache servers 140-1, 140-2, . . . , 140-$n$) may retrieve and/or cache game data regarding areas 210-1, 210-2, . . . , 210-25 from the database server to reduce number of accesses to the database server. In some embodiments, each of the multiple cache servers may be associated with or allocated to each of areas 210-1, 210-2, . . . , 210-25, and cache the game data regarding the corresponding one of areas 210-1, 210-2, . . . , 210-25.

As depicted in FIG. 2(A), when a player character is currently located at area 210-14, a load balancer (e.g., load balancer 150) may calculate probabilities of movement of the player character from area 210-14 to other areas, and may calculate copy factors from other cache servers corresponding to the other areas to a cache server corresponding to area 210-14. By way of example, but not limitation, when the load balancer finds and calculates the probabilities of movement of the player character from area 210-14 to other areas as depicted in FIG. 2(A), and finds the amount of cached data in each of the cache servers corresponding to the areas as depicted in FIG. 2(B), the load balancer may calculate the respective copy factors from the cache servers corresponding to the other areas from the cache server corresponding to area 210-14 in accordance with Formula 1 above. The load balancer may dynamically manage or configure the cache servers by copying the cached data among cache servers based at least in part on the copy factor calculated in accordance with Formula 1 above, thereby providing load balancing between the database server and a game server.

Figure 3:
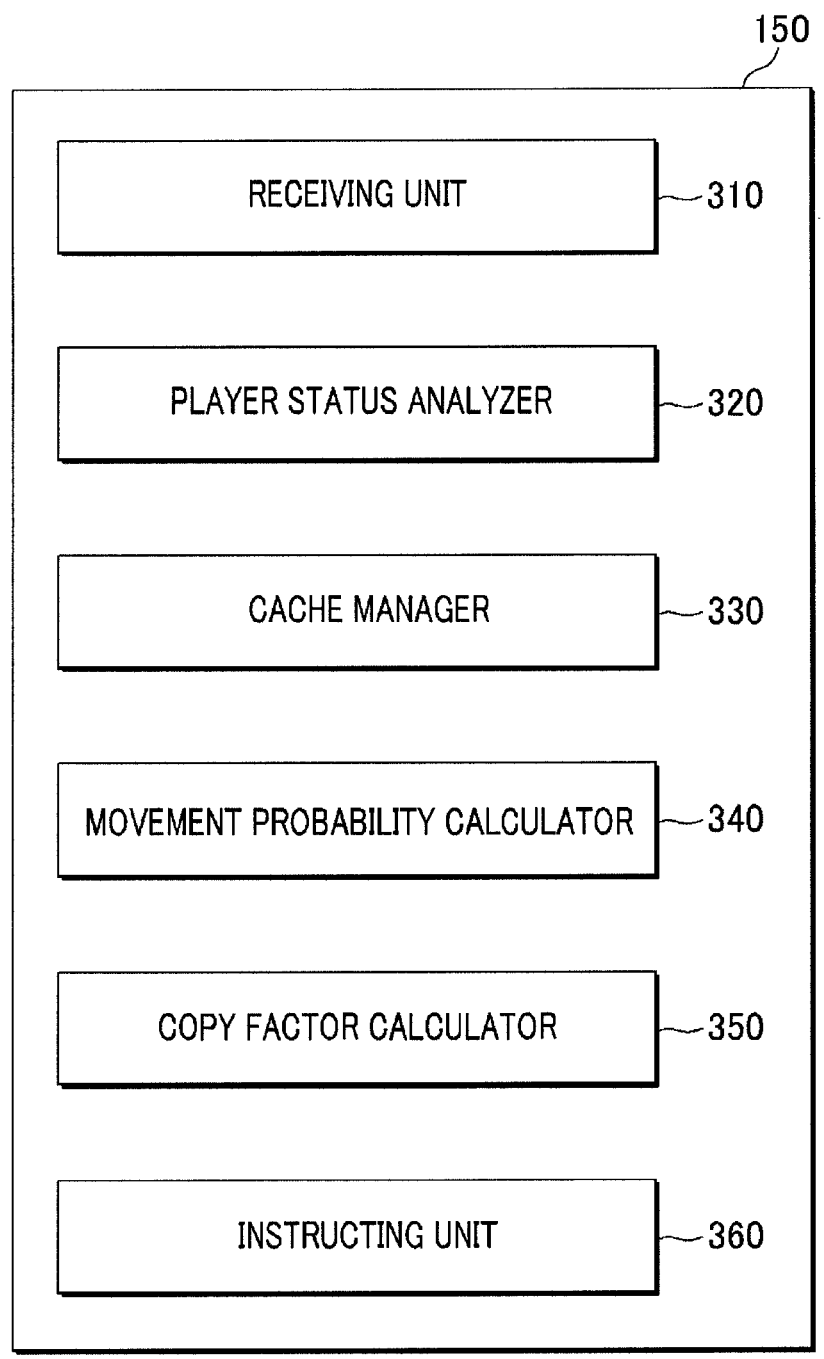
FIG. 3 shows a schematic block diagram of an illustrative example of a load balancer configured to provide load balancing between a database server and a game server, arranged in accordance with at least some embodiments described herein.

FIG. 3 shows a schematic block diagram of an illustrative example of a load balancer configured to provide load balancing between a database server and a game server in accordance with at least some embodiments described herein. As depicted, a load balancer 150 may include a receiving unit 310, a player status analyzer 320, a cache manager 330, a movement probability calculator 340, a copy factor calculator 350 and an instructing unit 360. Although illustrated as discrete components, various components may be divided into additional components, combined into fewer components, or eliminated altogether while being contemplated within the scope of the disclosed subject matter.

Receiving unit 310 may be configured to receive a request for a player character from a user client of a game. In some embodiments, the request for the player character may be associated with at least one of an action and movement of the player character. By way of example, but not limitation, the action of the player character may be associated with an action using a transfer means in a virtual space of the game.

Player status analyzer 320 may be configured to analyze a status of the player character located in the virtual space. In some embodiments, the virtual space may be configured to have multiple areas and the player character may be located in a first area among the multiple areas. By way of example, but not limitation, the status of the player character may be associated with information of position of the player character, information of level of the player character, information of equipment of the player character, organization information of party including the player character, information of quest of the player character and information of transfer means which the player character is using.

In some embodiments, player status analyzer 320 may analyze the status of the player character based on the request for the player character. By way of example, but not limitation, the request may include information of the player character, and player status analyzer 320 may obtain the information of the player character from the request and analyze the status of the player character using the acquired information.

Cache manager 330 may be configured to associate the multiple areas (e.g., areas 160-1, 160-2, . . . , 160-$n$) of the virtual space with multiple cache servers (e.g., cache servers 140-1, 140-2, . . . , 140-$n$). In some embodiments, each of the cache servers may cache from a database server (e.g., database server 130) information on an area allocated thereto. In some embodiments, the cache servers may include in-memory cache servers.

Movement probability calculator 340 may be configured to calculate a probability of movement of the player character from the first area to a second area among the multiple areas. In some embodiments, movement probability calculator 340 may calculate the probability based at least in part on the status of the player analyzed by player status analyzer 320, such as the information of level of the player character, the organization information of party including the player character, the information of quest of the player character and the information of transfer means which the player character is using.

Copy factor calculator 350 may be configured to calculate a copy factor from a second cache server corresponding to the second area to a first cache server corresponding to the first area, that is, amount of cached data to copy from the second cache server corresponding to the second area to the first cache server corresponding to the first area based at least in part on the probability of movement calculated by movement probability calculator 340. In some embodiments, copy factor calculator 350 may calculate the amount of cached data to copy from the second cache server to the first cache server considering a distance between the first area and the second area.

Instructing unit 360 may be configured to instruct cache manager 330 to copy data associated with the second area from the second cache server to the first cache server based at least in part on the amount of cache copy calculated by copy factor calculator 350, thereby providing load balancing between the database server and the game server. In some embodiments, the data associated with the second area include at least one of environmental information of the second area and information of the player character at the second area. By way of example, but not limitation, the environment information of the first area and the environment information of the second area may include weather information of the first area and the second area, respectively.

Figure 4:
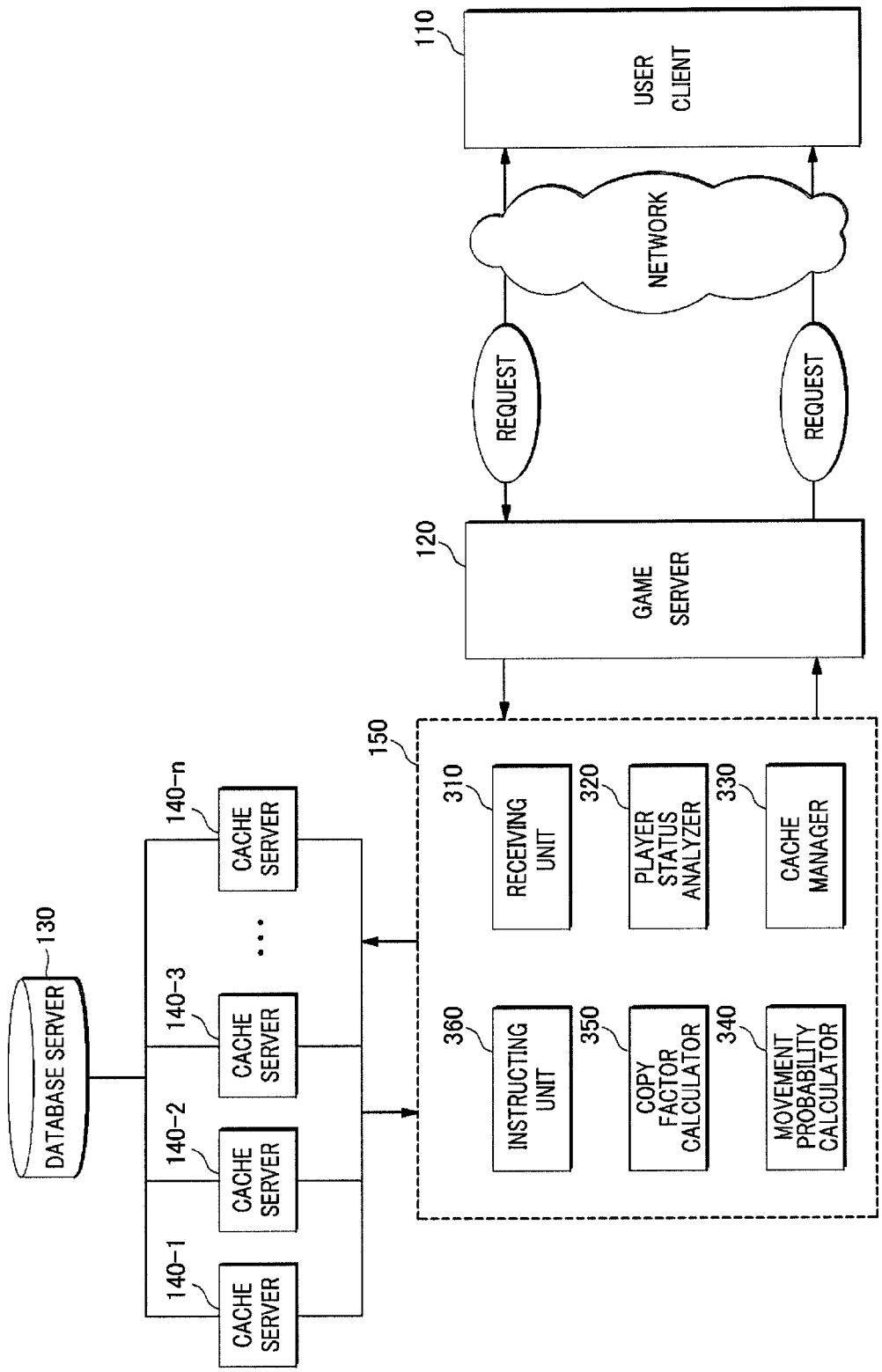
FIG. 4 schematically shows an illustrative example system configured to provide load balancing between a database server and a game server, arranged in accordance with at least some embodiments described herein.

FIG. 4 schematically shows an illustrative example system configured to provide load balancing between a database server and a game server in accordance with at least some embodiments described herein. As depicted, when a user runs or executes on user client 110 a game program such as, for example, massive multiplayer online role playing game (MMORPG) program, user client 110 may send to game server 120 a request for game data related to a player character in a virtual space, which may be stored in database server 130. Then, game server 120 may send the received request to load balancer 150.

In some embodiments, receiving unit 310 in load balancer 150 may receive the request for game data from game server. Then, receiving unit 310 may send the received request to player status analyzer 320. In some embodiments, player status analyzer 320 may analyze a status of the player character based on the request, which is associated with an action or movement of the player character.

In some embodiments, cache manager 330 in load balancer 150, which may manage an association between cache servers 140-1, 140-2, . . . , 140-n and virtual space areas, may find relevant cache servers including a cache server corresponding to the current location of the player character based at least in part on the status of the player character analyzed by player status analyzer 320.

In some embodiments, movement probability calculator 340 in load balancer 150 may calculate a probability of movement of the player character from a first virtual space area, to which the current location of the player character may belong, to a second virtual space area, based at least in part on the status of the player character analyzed by player status analyzer 320.

In some embodiments, copy factor calculator 350 in load balancer 150 may calculate an amount of cached data to copy from a second cache server corresponding to the second area to a first cache server corresponding to the first area based at least in part on the probability calculated by movement probability calculator 340.

In some embodiments, instructing unit 360 may instruct cache manager 330 to copy data associated with the second area from the second cache server to the first cache server based at least in part on the calculated amount of cache copy.

In some embodiments, load balancer 150 may dynamically manage or configure cache servers 140-1, 140-2, . . . , 140-n by copying the calculated amount of cached data from the second cache server to the first cache server based at least in part on the amount of cached data to copy from the second cache server to the first cache server calculated by copy factor calculator 350.

Figure 5:
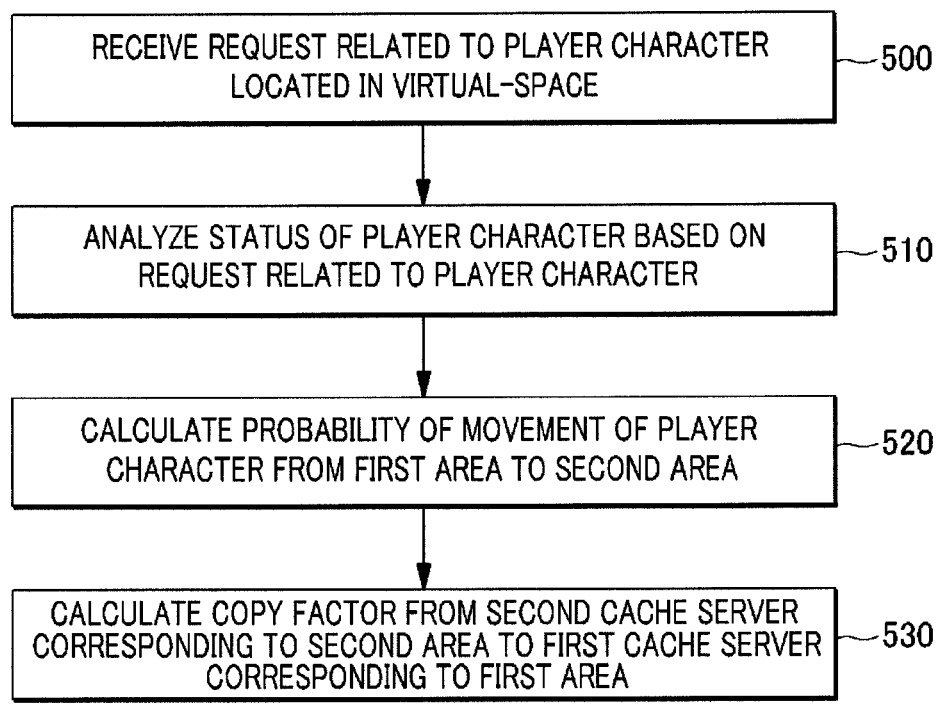
FIG. 5 shows an example flow diagram of a process for providing load balancing between a database server and a game server, arranged in accordance with at least some embodiments described herein.

FIG. 5 shows an example flow diagram of a process for providing load balancing between a database server and a game server in accordance with at least some embodiments described herein. The method in FIG. 5 may be implemented in a load balancer such as load balancer 150 including receiving unit 310, player status analyzer 320, cache manager 330, movement probability calculator 340, copy factor calculator 350 and instructing unit 360 discussed above. An example process may include one or more operations, actions, or functions as illustrated by one or more blocks 500, 510, 520 and/or 530. Although illustrated as discrete blocks, various blocks may be divided into additional blocks, combined into fewer blocks, or eliminated, depending on the desired implementation. Processing may begin at block 500.

At block 500, the load balancer may receive a request related to a player character located in a virtual space from a player of a game associated with the player character. By way of example, but not limitation, the request may be associated with at least one of an action and movement of the player character. In some embodiments, the virtual space may be configured to have multiple areas and the player character may be located in a first area among the multiple areas. Processing may continue from block 500 to block 510.

At block 510, the load balancer may analyze a status of the player character based at least in part on the request related to the player character. By way of example, but not limitation, the status of the player character is associated with at least one of position information, level information, equipment information, party organization information, quest information and transfer means information of the player character. Processing may continue from block 510 to block 520.

At block 520, the load balancer may calculate a probability of movement of the player character from the first area to a second area among the multiple areas. In some embodiments, the load balancer may calculate the probability based at least in part on the analyzed status. By way of example, but not limitation, the load balancer may calculate the probability considering the information of level of the player character, the organization information of party including the player character, the information of quest of the player character and the information of transfer means which the player character is using. Processing may continue from block 520 to block 530.

At block 530, the load balancer may calculate an amount of cached data to copy from a second cache server corresponding to the second area to a first cache server corresponding to the first area, i.e., a copy factor from the second cache server to the first cache server.

In some embodiments, the load balancer may calculate the amount of cached data to copy based at least in part on the calculated probability.

In some embodiments, the load balancer may calculate the amount of cached data to copy further based on a distance between the first area and the second area.

In some embodiments, the first cache server and the second cache server may respectively cache from a database server information on the first area and information on the second area.

In some embodiments, the higher the probability of movement is, the larger the amount of cache copy is.

In some embodiments, the load balancer may dynamically manage or configure the cache servers by copying the calculated amount of cached data from the second cache server to the first cache server.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
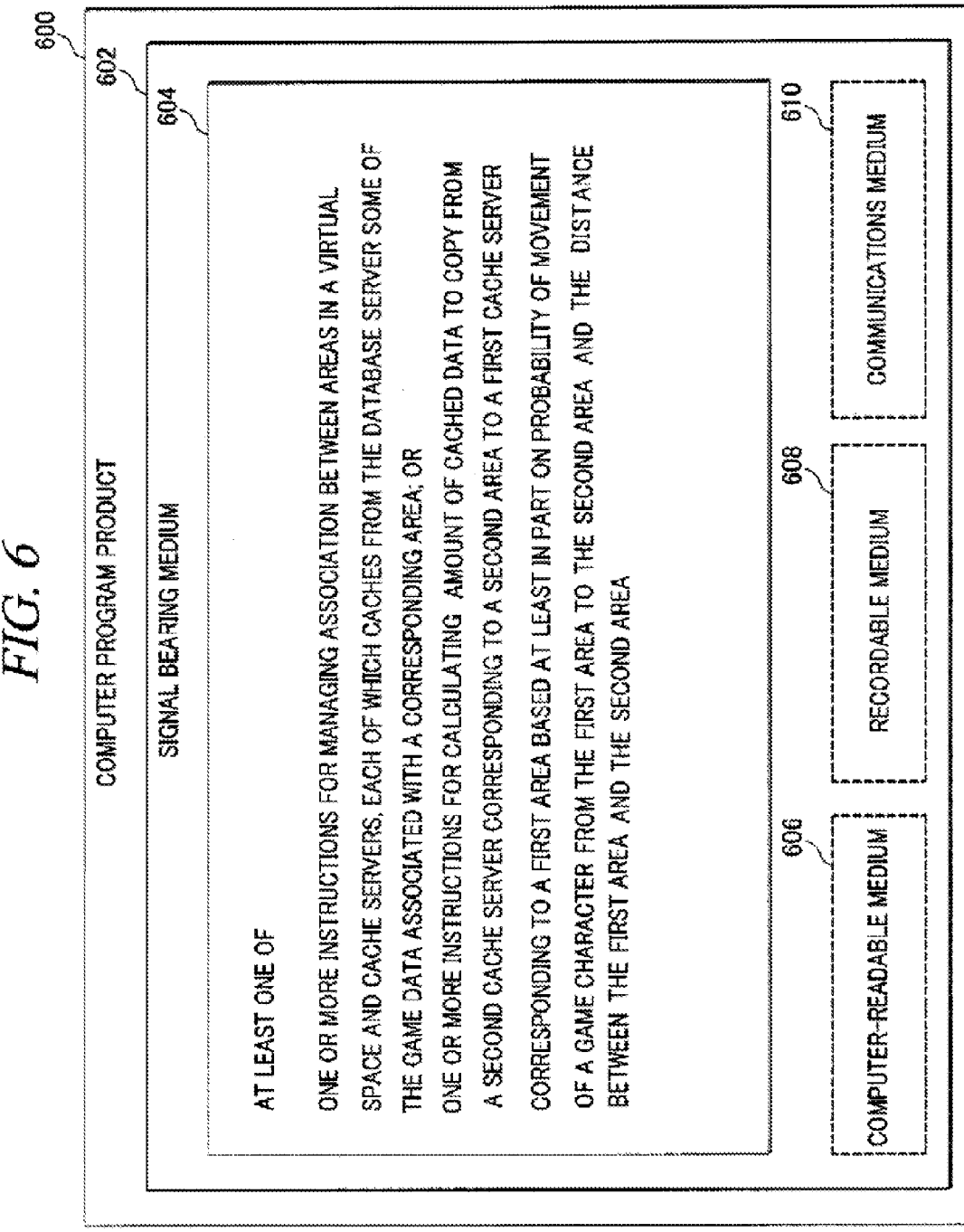
FIG. 6 illustrates computer program products that can be utilized to provide load balancing between a database server and a game server, arranged in accordance with at least some embodiments described herein.

FIG. 6 illustrates computer program products that may be utilized to provide load balancing between a database server and a game server in accordance with at least some embodiments described herein. Program product 600 may include a signal bearing medium 602. Signal bearing medium 602 may include one or more instructions 604 that, when executed by, for example, a processor, may provide the functionality described above with respect to FIGS. 1-5. By way of example, instructions 604 may include: one or more instructions for managing association between areas in a virtual space and cache servers, each of which caches from the database server some of the game data associated with a corresponding area; one or more instructions for calculating amount of cached data to copy from a second cache server corresponding to a second area to a first cache server corresponding to a first area based at least in part on probability of movement of a game character from the first area to the second area and distance between the first area and the second area. Thus, for example, referring to FIG. 3, load balancer 150 may undertake one or more of the blocks shown in FIG. 5 in response to instructions 604.

In some implementations, signal bearing medium 602 may encompass a computer-readable medium 606, such as, but not limited to, a hard disk drive, a CD, a DVD, a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, program product 600 may be conveyed to one or more modules of load balancer 150 by an RF signal bearing medium 602, where the signal bearing medium 602 is conveyed by a wireless communications medium 610 (e.g., a wireless communications medium conforming with the IEEE 802.11 standard).

Figure 7:
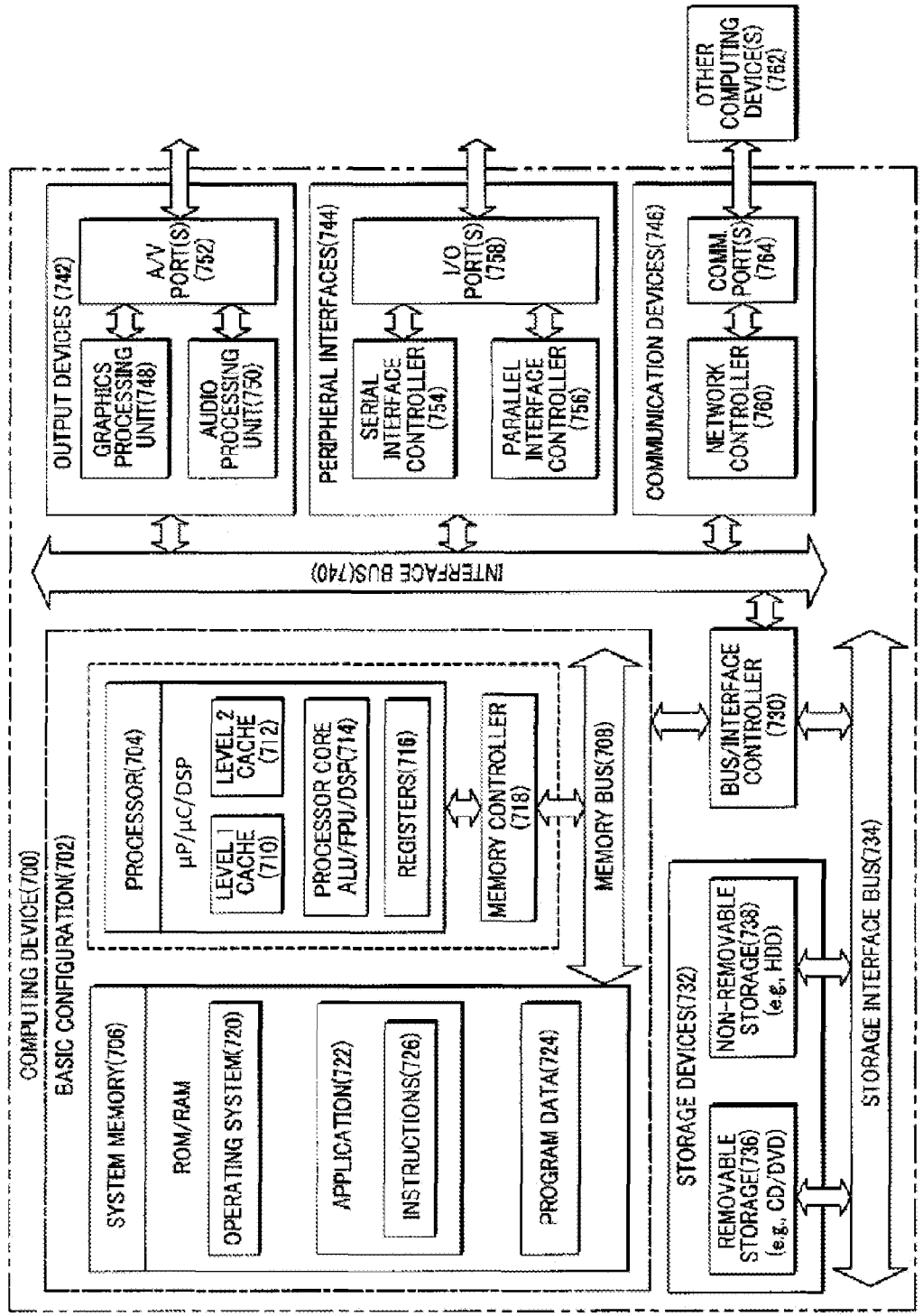
FIG. 7 is a block diagram illustrating an example computing device that can be utilized to provide load balancing between a database server and a game server, arranged in accordance with at least some embodiments described herein.

FIG. 7 is a block diagram illustrating an example computing device that may be utilized to provide a load balancing between a database server and a game server in accordance with at least some embodiments described herein. In these examples, elements of computing device 700 may be arranged or configured for a cloud computing system hosting a mobile service involving an online game such as an MMORPG. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include instructions 726 that may be arranged to perform the functions as described herein including the actions described with respect to the architecture of load balancer 150 as shown in FIG. 3 or including the actions described with respect to the flow charts shown in FIG. 5. Program data 724 may include data that may be utilized for implementing instructions 726 (e.g., a mesh structure for associating between cache servers and virtual space areas). In some examples, application 722 may be arranged to operate with program data 724 on an operating system 720 such that implementations for instructions for a load balancer as described herein.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method comprising:
analyzing a status of a player character located in a virtual space of a game, the virtual space being configured to have a plurality of areas and the player character being located in a first area among the plurality of areas;
calculating a probability of movement of the player character from the first area to a second area among the plurality of areas based at least in part on the analyzed status; and
calculating a quantity of cached data, the quantity representative of a portion of the cached data, to copy from a second cache server corresponding to the second area to a first cache server corresponding to the first area, the calculated quantity being proportional to the calculated probability.

2. The method of claim 1, further comprising:
receiving a request related to the player character from a player of a game that includes the player character,
wherein the analyzing is based at least in part on the request related to the player character.

3. The method of claim 2, wherein the request related to the player character is associated with at least one of an action and movement of the player character.

4. The method of claim 1, wherein the first cache server and the second cache server are in-memory cache servers.

5. The method of claim 1, wherein the first cache server and the second cache server respectively cache from a database server information on the first area and information on the second area.

6. The method of claim 1, wherein the higher the probability of movement is, the larger the calculated quantity of cached data to copy is.

7. The method of claim 1, wherein the calculating the quantity of cached data to copy is performed based at least in part on distance between the first area and the second area.

8. The method of claim 1, wherein the status of the player character is associated with at least one of position information, level information, equipment information, party organization information, quest information and transfer means information of the player character.

9. The method of claim 1, further comprising:
copying data associated with the second area from the second cache server to the first cache server based at least in part on the calculated quantity of cached data to copy.

10. The method of claim 9, wherein the data associated with the second area includes at least one of environmental information of the second area and information of the player character at the second area.

11. The method of claim 1, further comprising:
dynamically configuring data caches for database servers based at least in part on the calculated probability of movement of the player character.

12. A load balancer comprising at least one processor and a memory storing instructions which, when executed by the at least one processor, cause the at least processor to:
analyze a status of a player character located in a virtual space of a game, the virtual space being configured to have a plurality of areas and the player character being located in a first area among the plurality of areas;
associate the plurality of areas of the virtual space with a plurality of cache servers, wherein each cache server caches from a database server information on a respective area allocated thereto;
calculate a probability of movement of the player character from the first area to a second area among the plurality of areas; and
calculate a quantity of cached data, the quantity representative of a portion of the cached data, to copy from a second cache server corresponding to the second area to a first cache server corresponding to the first area, the calculated quantity being proportional at least in part to the probability calculated by the movement probability calculator.

13. The load balancer of claim 12, wherein the memory storing the instructions further
cause the at least one processor to:
receive a request for the player character from a player of a game that includes the game character, the request for the player character being associated with at least one of an action and movement of the player character; and
analyze the status of the player character based at least in part on the request for the player character.

14. The load balancer of claim 12, wherein the memory storing the instructions further cause the at least one processor to instruct the cache manager to copy data associated with the second area from the second cache server to the first cache server based at least in part on the calculated quantity of cached data to copy.

15. The load balancer of claim 14, wherein the data associated with the second area includes at least one of environmental information of the second area and information of the player character at the second area.

16. The load balancer of claim 12, wherein the first cache server and the second cache server are in-memory cache servers.

17. The load balancer of claim 12, wherein the memory storing the instructions further cause the at least one processor to calculate the quantity of cached data to copy from the second cache server to the first cache server based at least in part on distance between the first area and the second area.

18. The load balancer of claim 12, wherein the status of the player character is associated with at least one of position information, level information, equipment information, party organization information, quest information and transfer means information of the player character.

19. A non-transitory computer-readable storage medium which stores a computer-executable instructions to implement load balancing between a database server storing game data and a game server, wherein if executed by a computing device, the computer-executable instructions cause the computing device to perform operations comprising:
managing an association between areas in a virtual space of a game and cache servers, each of which caches from the database server some of the game data associated with a corresponding area; and
calculating a quantity of cached data, the quantity representative of a portion of the cached data, to copy from a second cache server corresponding to a second area to a first cache server corresponding to a first area, the calculated quantity being proportional to probability of movement of a game character from the first area to the second area and distance between the first area and the second area.

20. The non-transitory computer-readable storage medium of claim 19, wherein the computer-executable instructions, if executed by the computing device, cause the computing device to perform operations further comprising:
   analyzing a status of the game character, and
   calculating the quantity of cached data to copy based at least in part on the status of the game character.

21. The non-transitory computer-readable storage medium of claim 19, wherein the first cache server and the second cache server are in-memory cache servers.

22. The non-transitory computer-readable storage medium of claim 19, further comprising:
   dynamically configuring data caches for multiple database servers based at least in part on status and predicted positions of game characters; and
   caching calculated quantities of game data requested by game players associated with the game characters, the calculated quantities being proportional at least in part to the dynamic configuration.

\* \* \* \* \*